United States Patent [19]

Sharma

[11] Patent Number: 4,469,748

[45] Date of Patent: Sep. 4, 1984

[54] ADHESION OF ARAMID CORDS TO RUBBER

[75] Inventor: Satish C. Sharma, Mogadore, Ohio

[73] Assignee: The General Tire & Rubber Company, Akron, Ohio

[21] Appl. No.: 510,715

[22] Filed: Jul. 5, 1983

[51] Int. Cl.$^3$ ............................................. D02G 3/00
[52] U.S. Cl. ................................ 428/378; 156/110.1; 156/274.4; 427/38; 427/322; 428/267; 428/395; 525/133; 525/139; 525/142
[58] Field of Search ............... 525/133, 139; 524/510, 524/511; 156/110 A, 331.6, 335; 204/164; 427/38, 322; 428/378, 395, 267

[56] References Cited

U.S. PATENT DOCUMENTS 3,477,902 11/1969 Tomasino et al. .................. 428/251
3,853,657 12/1974 Lawton ............................... 427/322
4,251,409 2/1981 Neubert .............................. 524/504

FOREIGN PATENT DOCUMENTS 2053026 2/1981 United Kingdom .

Primary Examiner—Theodore E. Pertilla

[57] ABSTRACT

An aramid reinforcing element is treated with a cold gas plasma of air, $N_2$, He, Ne or Ar or mixture thereof at up to 300 watts power for a few seconds to several minutes to improve its adhesion to rubber compounds.

28 Claims, No Drawings

ADHESION OF ARAMID CORDS TO RUBBER

This invention relates to the adhesion of aramid reinforcing elements such as cords, fabric or fibers to rubber.

BACKGROUND OF THE INVENTION

Gas plasma basically consists of highly excited gas/vapor species (i.e., molecules, ions, free radicals) produced by bombarding gases with energy. Some familiar examples of gas plasma are sun (thermal plasma) and neon signs (cold plasma). The temperature of the constituents in the thermal plasma is in the thousands of degrees, whereas in the cold plasma, the temperature is from ambient to a few hundred degrees. Corona discharges lie in between these two plasmas and may be termed hybrid plasmas.

The use of cold plasma for the "surface modification" of polymers has increased significantly during the past 10-15 years. The desired surface modifications have included increased wettability[1-4], hydrophilicity[5] and bonding[1,2,4,6]. Other areas have included the grafting of monomers onto polymer surfaces[7-10] and the deposition of thin protective coatings of organic and inorganic precursors on metal[11-13] and polymer surfaces[14]. A number of papers on the surface modification of polymers by corona discharge treatment have also appeared[15-19].

Cold plasma treatment for surface modification can be divided into the following classes according to the type of vapor and procedure employed[6]:
I. Chemically inert plasma using Ar, He, etc.
II. Nonpolymerizable reactive-gas plasmas using $N_2$, $NH_3$, air etc.
III. "Grafting" plasmas in which the substrate is first activated in an Ar plasma and then immediately exposed to a polymerizable vapor in the absence of plasma.
IV. "Polymerizable" reactive gas plasmas which can employ both unsaturated and saturated hydrocarbons, and organometallic molecules. The resulting polymer coatings in such cases are usually significantly different from the precursors both in molecular structure and composition. This is because the "polymerization" process in this case involves considerable fragmentation of the precursors and recombination of some of the fragments. Ablation of the deposited coating can also be important in this case.

Needless to say, the first two of the above are the simplest of the cold plasma surface treatments. While limited in scope, they have been shown to result in significant adhesion improvement of the treated substrates. It was found that treatment of poly(monochloro-p-xylene) in Ar, He and $O_2$ plasma increased its adhesion to urethane coatings by a factor of ten over the untreated control[4]. Power levels used were 50-100 watts and treatment times ranged from 1-6 minutes. Water contact angles were found to decrease in all cases, but in the case of $O_2$ plasma, oxygen was found to be incorporated into the surface polymer. Interestingly, Ar and He treatments gave somewhat higher adhesions than the oxygen treatment. The beneficial effects of plasma treatment were found to persist in at least up to one week of storage before application of a urethane coating.

Treatment of non-adhesive activated polyester (PET) filaments and cords in various gas plasmas ($N_2$, Ar, He, $H_2$, $NH_3$, $H_2O$, $CO_2$, $O_2$) was found to increase cord-RFL rubber H-adhesion by about 100% over the untreated control[2]. Plasma treatment of PET, therefore, could replace a primer treatment in a two-step polyester dip system. All of the above gases gave essentially equivalent adhesion improvement. Power levels used were 75-275 watts and treatment times ranged from 4-34 seconds. Gas pressures were between 0.5-1.5 torr. A number of patents[20,21] claiming the use of plasma treatment for adhesion improvement in polyester cord-RFL-rubber system have issued.

It has been proposed that the increase in adhesion of polyester to rubber after plasma treatment resulted from crosslinking of the surface region inducing increased cohesive strength near the interface[23,24]. It, also, has been proposed that plasma treatment might have three effects: (1) increase in the potential for strong bonding by introducing polar groups, free radicals, etc., at the polymer surface; (2) increase in surface crosslinking and the contaminant energy dissipation; and (3) increase in elastic modulus through crosslinking[25].

Plasma treatment of KEVLAR for adhesion to epoxy resin gave up to 120% improvement in the peel strength adhesion of KEVLAR-epoxy laminates as a result of the plasma treatment[6,22]. All four classes of plasma described above were used. Generally Ar, $N_2$, $NH_3$ and air plasmas gave improvements of 30-80% in these studies. No adhesion studies for KEVLAR-rubber systems were carried out by these authors.

OBJECTS

An object of this invention is to provide a process for adhering or binding rubber to aramid fibers or reinforcing elements providing an increased adhesive bond between the aramid fibers and rubber. Another object is to provide aramid cords, fibers, fabric or reinforcing elements with a minor amount by weight of an adhesive so that subsequently said adhesive coated element may be bonded to rubber. A further object is to provide a composite of an aramid reinforcing element bonded to a rubber compound. These and other objects and advantages of the present invention will become more apparent to those skilled in the art from the following detailed description and working examples.

SUMMARY OF THE INVENTION

It has been found that cold plasma treatment of aramid fibers such as KEVLAR tire cords before application of the adhesive leads to an improvement in adhesion of the treated, dipped cord to rubber relative to the cords which are not plasma treated before dipping. The relative level of improvement depends on the type of adhesive used and can vary from about 10 to about 50%. An improvement of about 25-30% in KEVLAR-rubber adhesion results if the plasma treated undipped cord is compared to the untreated undipped control cord. Furthermore, the results obtained show that for plasma treated, dipped cords the mode of failure is predominantly through rubber tear. This suggests that the percentage improvement in cord-rubber bond strength as a result of plasma treatment may actually be higher than shown by the measurements used.

DISCUSSION OF DETAILS AND PREFERRED EMBODIMENTS

The aramid cords are treated in a cold gas plasma at from about 10 to 300, preferably from about 25 to 75, watts of power for from about 2 seconds to 30 minutes, preferably from about 2 to 20 minutes. These ranges can vary somewhat depending on the equipment size and loading of the equipment with the material to be treated but sufficient to enable improvement in adhesion of the cord to rubber. The gas used can be air, nitrogen, helium, neon or argon or mixture thereof; preferably the gas is nitrogen or argon. After plasma treatment the cords are dipped in a cord dip of a vinyl pyridine copolymer latex and a thermosetting water soluble phenolic-aldehyde resin, dried, embedded in a vulcanizable rubber compound and cured.

The aramid used as a reinforcing element in the practice of the present invention is poly(p-phenylene terephthalamide), e.g.

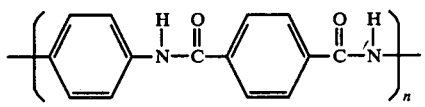

where n is a number. It is known as KEVLAR and is manufactured by the duPont Company. The aramid reinforcing element may be in the form of fibers, continuous filaments, staple, tow, yarns, cords (preferred), fabric and so forth.

The water soluble thermosetting (heat reactable) phenolic-aldehyde resin is made by reacting an aldehyde with a phenolic compound. The preferred aldehyde to use is formaldehyde, but acetaldehyde and furfural, also, may be used. In place of formaldehyde one may use paraformaldehyde or other formaldehyde donors such as hexamethylenetetramine and so forth. Also, it is preferred to start with formalin, usually a 37% solution of formaldehyde in water, which is easier to use. Mixtures of aldehydes can be used. The phenolic compound can be phenol itself, resorcinol, the cresols, the xylenols, p-tert butylphenol or p-phenyl phenol or mixture thereof. Mixtures of resins can be used. If a phenol-aldehyde resin is used, some resorcinol and/or resorcinol-aldehyde resin should be added to prevent or reduce tackiness. The reactants are reacted in water usually in the presence of a catalyst. One may start with a thermoplastic resin by reacting less than a molar amount of the aldehyde with the phenolic to form a condensation product and then may add sufficient aldehyde at the time the dip is formulated to convert the product to a thermosetting or infusible resin on heating. Alternatively, one may react a molar excess of the aldehyde with the phenolic to form a thermosetting type condensation product on heating and which should be used promptly. In any event, the final product on heating is a thermoset phenolic-aldehyde resin. Information on the preparation of the water soluble thermosetting phenolic-aldehyde resins will be found in "Encyclopedia of Chemical Technology," Kirk-Othmer, Volume 15, Second Edition, 1968, Interscience Publishers Division of John Wiley & Sons, Inc., New York, pages 176 to 208; "Technology of Adhesives," Delmonte, Reinhold Publishing Corp., New York, N.Y., 1947, pages 22 to 52; "Formaldehyde," Walker, A.C.S. Monograph Series, Reinhold Publishing Corp., New York, N.Y., Third Edition, 1964, pages 304 to 344 and "The Chemistry of Phenolic Resins," Martin, John Wiley & Sons, Inc., New York, 1956.

Rubbery aqueous alkaline vinyl pyridine copolymer latices are well known. See U.S. Pat. Nos. 2,561,215; 2,615,826; 3,437,122; 4,145,494; 4,251,409 and 4,285,850. They comprise a copolymer of about 50 to 95% by weight of butadiene-1,3, 5 to 40% by weight of a vinyl pyridine, and 0 to 40% by weight of a vinyl aromatic compound like styrene. Examples of suitable vinyl pyridines are 2-vinyl pyridine, 4-vinyl pyridine, 2-methyl-5-vinyl pyridine and 5-ethyl-2-vinyl pyridine. It is usually preferred to use a latex of a terpolymer of from about 60 to 80% by weight of butadiene-1,3, from about 7 to 32% by weight of styrene and from about 4 to 22% by weight of 2-vinyl pyridine. Even more preferred is a terpolymer of about 70% by weight of butadiene-1,3, 15% styrene and 15% 2-vinyl pyridine. Part of the vinyl pyridine copolymer may be replaced with a rubbery butadiene-styrene copolymer and/or a rubbery polybutadiene so long as the relative ratios between the butadiene-1,3, vinyl pyridine and styrene remain as set forth above.

The rubbery vinyl pyridine copolymer and the rubbery polybutadiene or rubbery butadiene copolymer are made in water using free radical catalysts, chelating agents, modifiers, emulsifiers, surfactants, stabilizers, short stopping agents and so forth. They may be hot or cold polymerized, and polymerization may or may not be carried to about 100% conversion. If polymerizations are carried out with appropriate amounts of chain transfer agents or modifiers and conversions are stopped below 100% conversion, low or no gel polymers are possible. Free radical aqueous emulsion polymerization is well known as shown by:

(1) Whitby et al, "Synthetic Rubber," John Wiley & Sons, Inc., New York, 1954;

(2) Schildknecht, "Vinyl and Related Polymers," John Wiley & Sons, Inc., New York, 1952;

(3) "Encyclopedia of Polymer Science and Technology," Interscience Publishers a division of John Wiley & Sons, Inc., New York, Vol. 2 (1965), Vol. 3 (1965), Vol. 5 (1966), Vol. 7 (1967) and Vol. 9 (1968) and (4) Bovey et al, "Emulsion Polymerization," Interscience Publishers, Inc., New York, 1955.

In addition to the surfactants or wetting agents, and any antioxidants already in the latex, additional surfactants, antioxidants and antidegradants may be added to the resin-latex dip in minor amounts.

The pH of the latex and of the dips should be on the alkaline side and the pH of any surfactants and stabilizers, including freeze-thaw stabilizers and other additives should be on the alkaline side or compatible or be neutral to avoid improper coagulation of the latex or latices.

Water is used in the adhesive phenolic-aldehyde/latex dip in an amount sufficient to provide for the desired dispersion of the rubber or latex particles, and for the solution of the resin and any other additives, to obtain the desired viscosities, and for the proper solids content to get the necessary pickup of solids on and penetration between the fibers of the cord. The amount of water in the adhesive cord dip generally may vary so as to provide a solids content of from about 10 to 50%, preferably from about 20 to 25%, by weight. Too much water may require use of excess heat to evaporate the water on drying. Too little water may cause uneven penetration or too slow coating speeds.

On a dry weight basis the phenolic-aldehyde resin is used in an amount of about 3 to 25, preferably from about 6 to 20, parts by weight per 100 parts by weight of the rubber of the latex of the dip.

To apply the resin/latex dip to the plasma treated aramid fiber cords in a reliable manner, the cords are fed through the adhesive dip bath while being maintained under a small predetermined tension and into a drying oven where they are dried under a small predetermined tension (to prevent sagging without any appreciable stretching). As the cords leave the oven they enter a cooling zone where they are air cooled before the tension is released. In each case the adhesive-coated cords leaving the dip are dried (cured or heat set) in the oven at from about 200° to 600° F. (93.3° to 315.6° C.) for from about 300 to 5 seconds. The time the cord remains in the adhesive is about a few seconds or more or at least for a period of time sufficient to allow wetting of the cord and at least some impregnation of the fibers of the cord. Successive treatments if desired, e.g., dipping and drying with the resin/latex dips, may be conducted in the same fashion.

The single-cord H-pull, H-adhesion, test is employed to determine the static adhesion of the dried (heat set or cured) adhesive coated plasma treated aramid fiber cords to rubber. In each case the rubber test specimens are made from a vulcanizable rubber composition comprising rubber, reinforcing carbon black and the customary compounding and curing ingredients. In every case the cords to be tested are placed in parallel positions in a multiple-strand mold of the type described in the single-cord H-pull adhesion test ASTM designated D 2138-72, the mold is filled with the unvulcanized rubber composition, the cords being maintained under a tension of 50 grams each, and the rubber is cured. Each rubber test specimen is ¼ inch thick and has a ⅜ inch cord embedment. After the rubber has been cured, the hot cured rubber piece is removed from the mold, cooled and H-test specimens are cut from said piece, each specimen consisting of a single cord encased in rubber and having each end embedded in the center of a rubber tab or embedment having a length of around 1 inch or so. The specimens are then aged at least 16 hours at room temperature. The force required to separate the cord from the rubber is then determined at room temperature (about 25° C.) or at 250° F. (121° C.) using an INSTRON tester provided with specimen grips. The maximum force in pounds required to separate the cord from the rubber is the H-adhesion value. All the data submitted in the working examples which follow are based upon identical test conditions, and all of the test specimens were prepared and tested in the same way generally in accordance with ASTM Designation: D 2138-72.

Plasma treated aramid cords or fabric coated with the adhesive dips of the present invention can have up to about 20%, preferably up to about 15%, total by weight (dry) solids (pick up) of the adhesive dip, including a primer if used, on the cord based on the weight of the cord and can be used in the manufacture of carcasses, belts, flippers and chafers of radial, bias, or belted-bias passenger tires, truck tires, motorcycle tires, off-the-road tires and airplane tires, and, also, in making transmission belts, V-belts, conveyor belts, hose, gaskets, tarpaulins and the like.

While the adhesive containing plasma treated aramid fiber reinforcing element can be adhered to vulcanizable natural rubber, rubbery butadiene-styrene copolymer or rubbery polybutadiene or blend thereof by curing the same in combination together, it is apparent that the heat cured adhesive containing plasma treated aramid fiber reinforcing element can be adhered to other vulcanizable rubbery materials, by curing or vulcanizing the same in combination with the rubber, such as one or more of the foregoing rubbers as well as nitrile rubbers, chloroprene rubbers, polyisoprenes, acrylic rubbers, isoprene-acrylonitrile rubbers and the like and mixtures of the same. These rubbers can be mixed with the usual compounding ingredients including sulfur, stearic acid, zinc oxide, magnesium oxide, silica, carbon black, accelerators, antioxidants, antidegradants and other curatives, rubber compounding ingredients and the like well known to those skilled in the art for the particular rubbers being employed.

The following examples will serve to illustrate the present invention with more particularity to those skilled in the art. In these examples parts are parts by weight unless otherwise noted.

A. Equipment

Plasma Treatment Apparatus

PLASMOD (Tegal Corporation, Novato, Calif.) unit (26.7 cm. high, 30 cm wide, 37.6 cm long and weighing 32 lbs.) was used for plasma treatment. It consisted of a pyrex glass reaction chamber 15 cm long and 10.54 cm inside diameter. Power for plasma generation was supplied by two semi-cylindrical electrodes mounted all around the reaction chamber. The RF (radio frequency) power generator was a crystal controlled oscillator designed to provide up to 100 watts of continuous wave 13.56 MHz (mandated by FCC) power to the reaction chamber. Power output was controlled by a calibrated dial.

The gas/vapor was delivered to the reaction chamber through a delivery tube containing perforations (the part inside the chamber) to allow for even gas distribution. Provision was made to evacuate the chamber (cold plasma is a low pressure process). The vacuum valve was controlled in series with the RF generator switch to prevent RF power from coming on unless the chamber was evacuated. Accessories included a flow meter (Cole-Parmer FM062-01ST), a vacuum indicator (Labconco Model No. 75800) and a vacuum pump (Duo Seal, H. M. Welch Manufacturing Co.).

Cord Holder

A rectangular frame (14.5 cm long and 8.5 cm wide) was built from stainless steel tubing (0.63 mm nominal diameter) to string cords for placement in the plasma reaction chamber. Small holes about 0.8 cm apart were drilled and tapped along the two shorter sides and thin screws were inserted. A maximum of about 3.3 meters of cord could be strung on each frame and up to three such frames could be stacked in the chamber. A cord length of one meter was considered to be the minimum required for dipping and H-adhesion testing. Because of the nature of the frame, a number of cord-frame contact points (about 14 cm apart each) were involved and one side of the cord at these points may not have received the same level of plasma treatment as the rest of the cord. While this may have resulted in some adhesion variability, it was felt that this method of cord placement was better than placing the cord in a container as a loose bundle for plasma treatment.

B. Materials

Cord: KEVLAR (1500/3, poly(p-phenylene terephthalamide),

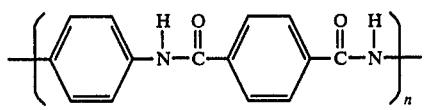

where n is a number), greige, as received from duPont.

Gases: $N_2$ and Ar—High purity grade as received from Akron Oxygen Company.

C. Procedures

Plasma Treatment

At the start of each day, the plasma unit was turned on to allow the tubes to warm up for at least fifteen minutes. The vacuum pump was then turned on and the chamber evacuated to <0.01 torr. Gas ($N_2$ or Ar) was then turned on and after the pressure had stabilized at about 1 torr, the RF power was turned on (50 watts level) to "burn off" any contaminants left in the chamber. After about 30 minutes of cleaning, the unit was considered ready for experimentation. The unit was tuned at the desired flow rate and power level with a dummy frame in place before beginning plasma treatments.

The frame containing the cords was placed in the reaction chamber and the chamber was evacuated for 2 minutes. Gas flow was turned on and the chamber pressure was recorded. RF power was turned on to generate the plasma and after the required treatment time, the power was turned off. Gas flow was stopped and the chamber was evacuated for 5 minutes. The vacuum valve was then turned off and the sample removed for dipping. Gas flow rates were varied between 40–100 ml/minute and the treatment times were between 0.2–20 minutes. Power levels were 25–75 watts although most of the runs were done at 50 watts power level.

Each sample was dipped immediately after plasma treatment. No studies for the effect of elapsed time (between plasma treatment and dipping) on adhesion were conducted.

Plasma treated samples for cord tensile and greige cord adhesion studies were stored in dessicators before vulcanizing and/or testing.

The plasma treated cords were passed through the adhesive dip to coat or impregnate the cords and then dried, cured or heat set in an air heated oven with 0% stretch for 90 seconds at 232° C.

The dips used were as follows:

| Material | Parts by Weight |
|---|---|
| Dip I | |
| Resin Master A | |
| Deionized Water | 238.5 |
| Resorcinol | 11.0 |
| NaOH | 0.3 |
| Formaldehyde (37%) | 16.2 |
| Total | 266.0 |
| Reacted at 25° C. for 6 hours | |
| Final Dip | |
| Deionized Water | 60.0 |
| Latex* | 244.0 |
| Resin Master A | 266.0 |
| NH$_4$OH (28%) | 11.3 |
| Total | 581.3 |
| Dip II | |
| Resin Master B | |
| Deionized Water | 10.0 |
| Phenol | 95.0 |
| NaOH | 3.0 |
| Formaldehyde (37%) | 243.0 |
| Total | 351.0 |
| Reacted at room temperature for five days or longer. | |
| Final Dip | |
| Deionized Water | 314.0 |
| Resorcinol | 4.9 |
| Resin Master B | 27.9 |
| Latex* | 237.0 |
| Total | 583.8 |

*Free radical aqueous emulsion polymerized terpolymer of about 70 parts by weight of butadiene-1,3, 15 parts by weight of styrene and 15 parts by weight of 2-vinyl pyridine. 41% solids, Brookfield viscosity (cps) of 30, pH of 10.7, Mooney viscosity ML-4 at 212° F. of 40, surface tension (dynes/cm) of 48 and substantially freeze stable.

The dipped and dried cords were next embedded in the following rubber compound, cured for 30 minutes at 153° C. and at 20 tons ram pressure and used for the H-adhesion tests.

| Rubber Compound | |
|---|---|
| Material | Parts By Weight |
| Natural Rubber | 46.5 |
| SBR-1551 (free radical aqueous emulsion, cold polymerized, copolymer of butadiene-1,3 and styrene, target bound styrene of 23.5%, nominal Mooney viscosity ML 1 + 4 (212° F.) of 52) | 38.5 |
| Polybutadiene (stereospecific, solution polymerized, 92–93% cis, nominal Mooney viscosity ML 1+ 4 at 100° C. of 45–47) | 15.0 |
| Fast extruding furnace carbon black | 45.0 |
| Precipitated hydrated amorphous silica (Hi-Sil 210, PPG Industries) | 15.0 |
| Oil, highly aromatic | 5.0 |
| Zinc oxide | 3.0 |
| Stearic acid | 1.5 |
| Antioxidant (BLE, high temperature reaction product of diphenyl amine and acetone, Uniroyal Chemical) | 2.7 |
| COHEDUR RL (a mixture of resorcinol and COHEDUR A, which is the hexa or pentamethyl ether of hexamethylol melamine, with a small amount of dibutyl phthalate plasticizer for viscosity control. Naftone, Inc.) | 4.7 |
| SANTOCURE NS (N—t-butyl-2-benzothiazolesulfenamide, Monsanto, Rubber Chemicals Div.) | 1.2 |
| Sulfur (80% sulfur in oil, CRYSTEX, Stauffer Chem.) | 3.0 |

EXAMPLE 1

Table 1 shows data on the effect of plasma treatment on the adhesion of KEVLAR tire cord. These data show the following:

1. Both $N_2$ and Ar plasma increased the adhesion of KEVLAR to rubber. The Ar plasma appeared to be more effective than the $N_2$ plasma but this effect may also be at least partly due to the pressure (chamber pressure in the case of $N_2$ was 0.70 Torr at start, increased to 1.2 torr when plasma was turned on and then decreased gradually to 0.75 torr at 15 minutes. The corresponding values for Ar plasma were 0.275 torr, 0.7 torr, and 0.30 torr, respectively).

2. With dip I as much as 50% improvement in adhesion (relative to the untreated but dipped control) was obtained, whereas with dip II the level of improvement was about 10%. This is largely because of the lower adhesion level of the dip I dipped untreated cord relative to the dip II control. This is why the dip I type dip is normally used with primer treated KEVLAR cord. Plasma treatment can, therefore, replace the primer treatment when dip I is used.

3. Plasma treated cord dipped in dip I was equivalent to the plasma treated cord dipped in dip II in terms of room temperature adhesion. The hot adhesion (121° C.) values for the dip 2 dipped cords, however, are about 10% higher than those for the corresponding dip I dipped cords.

4. As a result of plasma treatment, the mode of failure gradually shifts from cord-dip interface to predominantly rubber phase. Plasma treated dipped cords, therefore, approach the maximum adhesion level obtainable with this particular rubber compound.

TABLE 1

ADHESION OF PLASMA TREATED KEVLAR CORDS

| Run No. | Gas Used# | Time at 50 watts (minutes) | Dip Used |
|---|---|---|---|
| 1 | Untreated Control | | I |
| 2 | $N_2$ | 2 | I |
| 3 | $N_2$ | 5 | I |
| 4 | $N_2$ | 10 | I |
| 5 | Ar | 2 | I |
| 6 | Ar | 5 | I |
| 7 | Ar | 10 | I |
| 8 | Untreated Control | | II |
| 9 | $N_2$ | 2 | II |
| 10 | $N_2$ | 5 | II |
| 11 | $N_2$ | 10 | II |
| 12 | Ar | 2 | II |
| 13 | Ar | 5 | II |
| 14 | Ar | 10 | II |

| Run No. | H-Adhesion (Newtons) and Mode of Failure | | | |
|---|---|---|---|---|
| | RT (room temp., ca 25° C.) | | 121° C. | |
| 1 | 188 | Cord-dip interface | 129 | Cord-dip interface |
| 2 | 172 | Cord-dip interface | — | |
| 3 | 202 | Some rubber | — | |
| 4 | 232 | Some rubber | — | |
| 5 | 227 | Some rubber | — | |
| 6 | 272 | Mostly rubber | 186 | 60% rubber |
| 7 | 299 | Mostly rubber | 186 | 70% rubber |
| 8 | 271 | Mostly rubber | 189 | 60% rubber |
| 9 | 196 | Cord-dip interface | — | |
| 10 | 263 | Mostly rubber | 191 | 80% rubber |
| 11 | 280 | Mostly rubber | 203 | 80% rubber |
| 12 | 258 | 50% rubber | — | |
| 13 | 285 | Mostly rubber | 214 | 90% rubber |
| 14 | 294 | Mostly rubber | 208 | 90% rubber |

Flow rate was about 100 ml/minute.

EXAMPLE 2

The effect of gas flow rate on the efficacy of plasma treatment is shown in Table 2. The data show that at treatment times of 10–15 minutes, gas flow rate in the 40–100 ml/minute range does not significantly affect the adhesion level.

TABLE 2

ADHESION OF PLASMA TREATED KEVLAR CORDS EFFECT OF $N_2$ FLOW RATE

| | Treatment Conditions | | |
|---|---|---|---|
| Run No. | Gas Flow Rate ml/minute | Time at 50 watts (minutes) | H-Adhesions* (Newtons) and Mode of Failure RT |
| 20 | Untreated Control | | 232 Rubber + cord-dip interface |
| 21 | 40 | 5 | 238 Rubber + cord-dip interface |
| 22 | 40 | 10 | 267 Mostly rubber |
| 23 | 70 | 5 | 210 Mostly cord-dip interface |
| 24 | 70 | 15 | 248 Mostly rubber |
| 25 | 100 | 5 | 246 Mostly rubber |
| 26 | 100 | 15 | 274 Mostly rubber |

*Dip II was used.

EXAMPLE 3

The effect of power level (50 watts vs. 75 watts) at treatment times of 5–15 minutes was also found not to be significant in the adhesion of KEVLAR (Table 3).

TABLE 3

ADHESION OF PLASMA TREATED KEVLAR CORDS EFFECT OF POWER LEVEL

| | Plasma Treatment Conditions* | | Relative H-Adhesion | |
|---|---|---|---|---|
| Run No. | Power (watts) | Time minutes | RT | 121° C. |
| 30 | Untreated Control | | 100 | 100 |
| 31 | 50 | 5 | 108 | 110 |
| 32 | 50 | 8 | 110 | |
| 33 | 50 | 12 | 110 | |
| 34 | 50 | 20 | 111 | 111 |
| 35 | 75 | 5 | 111 | 103 |
| 36 | 75 | 8 | 108 | |
| 37 | 75 | 12 | 106 | |
| 38 | 75 | 20 | 107 | 107 |

*$N_2$ was used. Dip II was used. Gas flow rate was about 100 ml./min.

EXAMPLE 4

Table 4 gives data for the effect of plasma treatment on the adhesion of undipped KEVLAR to rubber. The data show that adhesion improvements obtained in this case are about 20–25% on the average. The percent improvement in this case is higher than that obtained for the dip II dipped cords (Tables 1, 2 and 3). Data in Table 4 gives a more realistic assessment of the extent of surface modification of KEVLAR as a result of plasma treatment since the matrix (rubber) strength is not the controlling factor in measured adhesion values in this case. In other KEVLAR-rubber composites, therefore, adhesion improvements of at least 20–25% may be expected as a result of plasma treatment of KEVLAR.

TABLE 4

ADHESION OF PLASMA TREATED KEVLAR CORD

| | Plasma* Treatment Conditions | | H-Adhesions (Newtons) and |
|---|---|---|---|
| Run No. | Gas Used | Time (minutes) | Mode of Failure RT |
| 40 | Untreated Control | | 130 Cord-rubber interface, A |
| 41 | $N_2$ | 2 | 147 A + some rubber |
| 42 | $N_2$ | 5 | 162 A + some rubber |
| 43 | $N_2$ | 10 | 160 A + some rubber |
| 44 | $N_2$ | 15 | 157 A + some rubber |
| 45 | Ar | 2 | 155 A + some rubber |
| 46 | Ar | 5 | 162 A + some rubber |
| 47 | Ar | 10 | 154 A + some rubber |
| 48 | Ar | 15 | 175 A + some rubber |

*50 watts power level. Gas flow rate was about 100 ml/minute.

EXAMPLE 5

The effect of plasma treatment on the tensile strength of undipped KEVLAR cord is shown in Table 5. These data were taken from two different sets of experiments. Relative values are shown because the values for the control cord in these two sets were not the same. The data show that the LASE [load at specified (2%) elongation] values generally decreased as the result of plasma treatment but the tensile strength and elongation to break were generally equal to or slightly better than the control. One possible explanation for these effects may be a slight reduction in the crystallinity of the cord which would tend to reduce LASE values while increasing the tensile strength and elongation to break. A reduction in the crystallinity of the cord filaments may also be at least partly responsible for adhesion improvement due to increased penetration of the adhesive into the filaments. The increase in elongation to break for multifilament KEVLAR cord was also found by Wertheimer et al[6, 22]. These authors, however, saw a loss of tensile strength as a result of plasma treatment. For example, these authors used microwave plasma at a frequency of 2.45 GHz and power loads of 100-700 watts and saw a tensile loss of as much as 40% after a short plasma treatment of about 1 minute in argon at 100 watts for KEVLAR. On the other hand, the present data show opposite results.

TABLE 5

TENSILE PROPERTIES* OF PLASMA TREATED KEVLAR CORDS

| | Plasma Treatment Conditions# | | |
|---|---|---|---|
| Run No. | Gas Used | Power (watts) | Time (minutes) |
| 50 | Untreated Control | | |
| 51 | Ar | 50 | 2 |
| 52 | Ar | 50 | 5 |
| 53 | Ar | 50 | 10 |
| 54 | $N_2$ | 50 | 2 |
| 55 | $N_2$ | 50 | 5 |
| 56 | $N_2$ | 50 | 10 |
| 57 | $N_2$ | 50 | 20 |
| 58 | $N_2$ | 75 | 5 |
| 59 | $N_2$ | 75 | 20 |

| | Relative Tensile Properties | | |
|---|---|---|---|
| Run No. | Load at 2% Elongation | Tensile Strength | Elongation at Break |
| 50 | 100 | 100 | 100 |
| 51 | 89 | 104 | 103 |
| 52 | 83 | 105 | 105 |
| 53 | 82 | 103 | 102 |
| 54 | 106 | 100 | 97 |
| 55 | 86-112 | 94-103 | 96-105 |
| 56 | 93 | 102 | 98 |
| 57 | 85 | 102 | 108 |
| 58 | 108 | 106 | 104 |
| 59 | 90 | 106 | 106 |

*Measured on undipped cords. Values reported are relative to a value of 100 for the untreated control cord.
Gas flow rate was about 100 ml/minute.

Plasma treated nylon 6, 6 (hexamethylene diamine/adipic acid copolymer) cord dipped in RFL and cured in a rubber compound did not exhibit any improvement over a control (no plasma treatment). Plasma treatment reduced the tensile strength of nylon 6, 6 and polyester cords.

REFERENCES

1. J. R. Hall, C. A. L. Westerdahl, A. T. Devine and M. J. Bodnar, J. Appl. Poly. Sci., 13, 2085 (1969).
2. E. L. Lawton, J. Appl. Poly. Sci., 18, 1557 (1974).
3. A. M. Wrobel, M. Kryszewski, W. Rakowski, M. Okonieswki and Z. Kukacki, Polymer, 19, 908 (1978).
4. T. E. Nowlin and D. F. Smith, Jr., J. Appl. Poly. Sci., 25, 1619 (1980).
5. H. Z. Jung, T. L. Ward and R. R. Benorito, Textile Research Journal (March 1977) page 217.
6. M. R. Wertheimer and H. P. Schreiber, J. Appl. Poly. Sci., 26, 2087 (1981).
7. A. Bradley and J. D. Fales, Chem. Tech. (April 1971) page 232.
8. J. D. Fales, A. Bradley and R. E. Howe, Research/Development (March 1976) page 53.
9. F. Denes, V. Percec, M. Totolin and J. P. Kennedy, Polymer Bulletin, 2, 499 (1980).
10. H. Yasuda, B. Sherry, M. A. El-Nokaly and S. E. Friberg, J. Appl. Poly. Sci., 27, 1735 (1982).
11. H. Yasuda in "Thin Film Processes," Eds. J. L. Vossen and W. Kern, Academic Press, Inc. (1978), Chapter IV-2.
12. E. Kay, L. L. Levenson and W. J. James, J. Vac. Sci. Technol., 16 (2), 359 (1979).
13. E. Kay and A. Kilks, J. Vac. Sci. Technol., 16 (2), 428 (1979).
14. A. Moshonov and Y. Avny, J. Appl. Poly. Sci., 25, 771 (1980).
15. D. K. Owens, J. Appl. Poly. Sci., 19, 265 (1975); 19, 3315 (1975).
16. B. Leclercq, M. Sotton, A. Baszkin and L. Ter-Minassin-Saraga, Polymer, 18, 675 (1977).
17. A. R. Blythe, D. Briggs, C. R. Kendall, D. G. Rance and V. J. I. Zichy, Polymer, 19, 1273 (1978).
18. D. Briggs, D. G. Rance, C. R. Kendall and A. R. Blythe, Polymer, 21, 895 (1980).
19. D. Briggs and C. R. Kendall, Int. J. Adhesion and Adhesives, January 1982, page 13.
20. C. Tomasino and G. K. Lake, U.S. Pat. No. 3,477,902, Oct. 14, 1969 (to Radiation Research Corporation).
21. E. L. Lawton, U.S. Pat. No. 3,853,657, Dec. 10, 1974 (to Monsanto Company).
22. H. P. Schreiber and M. R. Wertheimer, U.K. Pat. GB No. 2,053,026, Feb. 4, 1981.
23. H. Schonhorn and R. H. Hansen, J. Appl. Poly. Sci., 11, 1461 (1967).
24. H. Schonhorn, F. W. Rayn and R. H. Hansen, J. Adhesion, 2, 93 (1970).
25. R. J. Good, J. Adhesion, 4, 133 (1972).

I claim:

1. A method for adhering a poly(p-phenylene terephthalamide) reinforcing element to a rubber compound which comprises (I) treating said element with a composition comprising an aqueous alkaline dispersion of about 10 to 50% by weight of solids comprising (a) a rubbery vinyl pyridine copolymer and (b) a water soluble thermosetting phenolic-aldehyde resin in an amount of from about 3 to 25 parts by weight dry per 100 parts total by weight dry of (a), heating said treated element at a temperature of from about 200° to 600° F. for from about 300 to 5 seconds to remove essentially all of the water from said composition and to provide said element with a heat cured or heat set dry adhesive in an amount of up to about 20% total by weight (dry) based on the weight of said reinforcing element, and (II) combining said dried and heat cured adhesive containing reinforcing element with an unvulcanized vulcanizable rubber compound and vulcanizing the same, said reinforcing element prior to treatment with said composition having been treated in a cold gas plasma for from about 2 seconds to 30 minutes at from about 10 to 300 watts of power where said gas is selected from the group consisting of air, nitrogen, helium, neon and argon and mixture thereof.

2. A method according to claim 1 where said plasma is conducted from about 2 L to 20 minutes at about 25 to 75 watts of power.

3. A method according to claim 2 where said gas is nitrogen.

4. A method according to claim 2 where said gas is argon.

5. A method according to claim 1 where in (b) the resin comprises a mixture of a resorcinol-formaldehyde resin and a phenol-formaldehyde resin.

6. A method according to claim 1 where in (b) the resin comprises a resorcinol-formaldehyde resin.

7. A method according to claim 1 wherein said rubbery vinyl pyridine copolymer of (a) is a terpolymer of from about 60 to 80% by weight of butadiene-1,3, from about 7 to 32% by weight of styrene, and from about 4 to 22% by weight of 2-vinyl pyridine, wherein said phenolic-aldehyde resin of (b) is used in an amount of from about 6 to 20 parts by weight dry per 100 parts total by weight dry of (a), wherein said phenolic-aldehyde resin of (b) comprises a mixture of a phenol-formaldehyde resin and a resorcinol-formaldehyde resin, wherein said reinforcing agent contains up to about 15% total by weight of said dry adhesive and wherein the solids content of said dispersion is from about 20 to 25% by weight.

8. A method which comprises (I) treating a poly(p-phenylene terephthalamide) reinforcing element with a composition comprising an aqueous alkaline dispersion of about 10 to 50% by weight of solids comprising (a) a rubbery vinyl pyridine copolymer and (b) a water soluble thermosetting phenolic-aldehyde resin in an amount of from about 3 to 25 parts by weight dry per 100 parts total by weight dry of (a), heating said treated element at a temperature of from about 200° to 600° F. for from about 300 to 5 seconds to remove essentially all of the water from said composition and to provide said element with a heat cured or heat set dry adhesive in an amount of up to about 20% total by weight (dry) based on the weight of said reinforcing element, said reinforcing element prior to treatment with said composition having been treated in a cold gas plasma for from about 2 seconds to 30 minutes at from about 10 to 300 watts of power where said gas is selected from the group consisting of air, nitrogen, helium, neon and argon and mixture thereof.

9. A method according to claim 8 where said plasma is conducted from about 2 to 20 minutes at about 25 to 75 watts of power.

10. A method according to claim 9 where said gas is nitrogen.

11. A method according to claim 9 where said gas is argon.

12. A method according to claim 8 where in (b) the resin comprises a mixture of a resorcinol-formaldehyde resin and a phenol-formaldehyde resin.

13. A method according to claim 8 where in (b) the resin comprises a resorcinol-formaldehyde resin.

14. A method according to claim 8 wherein said rubbery vinyl pyridine copolymer of (a) is a terpolymer of from about 60 to 80% by weight of butadiene-1,3, from about 7 to 32% by weight of styrene, and from about 4 to 22% by weight of 2-vinyl pyridine, wherein said phenolic-aldehyde resin of (b) is used in an amount of from about 6 to 20 parts by weight dry per 100 parts total by weight dry of (a), wherein said phenolic-aldehyde resin of (b) comprises a mixture of a phenol-formaldehyde resin and a resorcinol-formaldehyde resin, wherein said reinforcing agent contains up to about 15% total by weight of said dry adhesive and wherein the solid contents of said dispersion is from about 20 to 25% by weight.

15. The product produced by the method of claim 1.
16. The method produced by the method of claim 2.
17. The product produced by the method of claim 3.
18. The product produced by the method of claim 4.
19. The product produced by the method of claim 5.
20. The product produced by the method of claim 6.
21. The product produced by the method of claim 7.
22. The product produced by the method of claim 8.
23. The product produced by the method of claim 9.
24. The product produced by the method of claim 10.
25. The product produced by the method of claim 11.
26. The product produced by the method of claim 12.
27. The product produced by the method of claim 13.
28. The product produced by the method of claim 14.

* * * * *

UNITED STATES PATENT AND TRADEMARK OFFICE
CERTIFICATE OF CORRECTION

PATENT NO. : 4,469,748
DATED : September 4, 1984
INVENTOR(S) : Satish C. Sharma

It is certified that error appears in the above–identified patent and that said Letters Patent are hereby corrected as shown below:

Column 13, line 7, which reads "2 L" should read ---2---.

Signed and Sealed this

Twenty-second Day of January 1985

[SEAL]

Attest:

DONALD J. QUIGG

Attesting Officer        Acting Commissioner of Patents and Trademarks